W. L. SHEPARD.
HYDRAULIC POWER APPARATUS.
APPLICATION FILED FEB. 4, 1921.

1,409,249.

Patented Mar. 14, 1922.

W. L. Shepard
INVENTOR.

BY

ATTORNEY.

UNITED STATES PATENT OFFICE.

WILBUR L. SHEPARD, OF ELMWOOD, CONNECTICUT, ASSIGNOR OF ONE-HALF TO A. N. PIERSON, OF CROMWELL, CONNECTICUT.

HYDRAULIC-POWER APPARATUS.

1,409,249.        Specification of Letters Patent.        Patented Mar. 14, 1922.

Application filed February 4, 1921. Serial No. 442,385.

*To all whom it may concern:*

Be it known that WILBUR L. SHEPARD, a citizen of the United States, residing at Elmwood, in the county of Hartford and State of Connecticut, has invented certain new and useful Improvements in Hydraulic-Power Apparatus, of which the following is a specification.

This invention relates to a hydraulic power apparatus and it may be mounted in a river or other body of water having a tide or its equivalent the object being the provision of means of an effective nature by which power of the tide or current may be applied to a water-wheel or analogous appliance to operate the same to transfer power.

In the drawings accompanying and forming part of the present specification, I have shown in detail one of the several forms of embodiment of the invention which to enable those skilled in the art to practice the same will be set forth fully in the following description. Clearly I am not restricted to the disclosure made by said drawings and description. I may depart therefrom in several particulars within the scope of the invention defined by the claims following said description.

Referring to said drawings.

Like characters refer to like parts in both views.

The apparatus involves in its construction a body portion or foundation such as 2 which is generally of cement and is built up from the bed or bottom of the body of water in connection with which the appliance is associated. This body 2 comprises one or more channels or ways as 3 for the flow or passage of the water. I have shown one way and its adjuncts in full and part of another. The number of them may vary and there may in fact be cases where there is but a single channel or waterway, the tide as it rises and falls flowing alternately through the way or ways 3. At the ends of these ways are grids 4 to prevent the passage therethrough of particles of various kinds.

Figure 1:
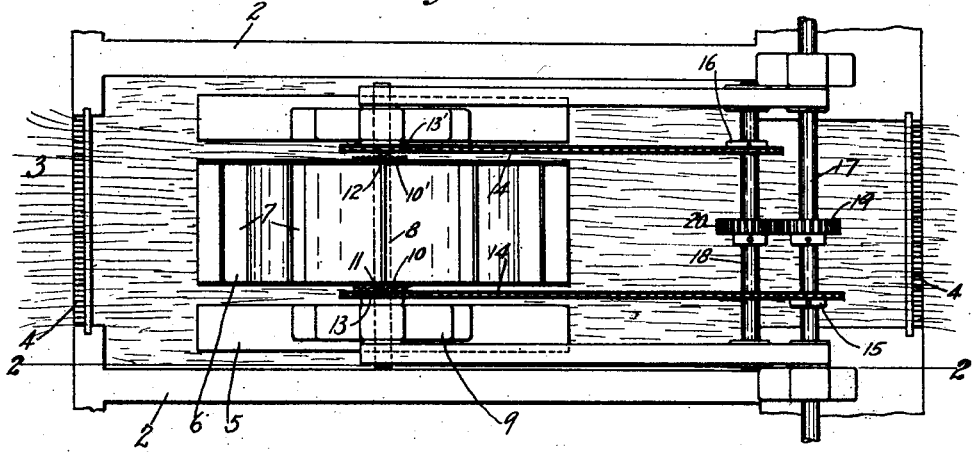
Figure 1 is a top plan view of an apparatus involving the invention.

Within the way or channel 3 is a float as 5 open at its ends as shown best in Fig. 1 for the passage of water. This float constitutes a suitable support for a water wheel as 6 which has upon its peripheral portion the buckets or vanes 7 so that the water can act thereagainst to rotate the wheel. There is shown as loosely extending through the center of the wheel the shaft 8 supported at its ends by pillow blocks or bearings on the gunwales or sides of the float 5. The water wheel 6 has fastened to the central portion thereof on the outer surface of the same the ratchet wheels 10 and 10′ the teeth of which face oppositely and co-operate with the oppositely placed pawls 11 and 12 pivoted as shown to the inner sides of drivers as 13 and 13′ loose upon the transverse shaft 8. The drivers 13 and 13′ as shown consist of sprocket wheels and receive around them the belts or chains 14 which also pass around the sprocket wheels 15 and 16 rigidly fastened to the main shaft 17 and the countershaft 18. The main and counter-shafts have rigid with them spur gears 19 and 20 respectively of the same size and the teeth of which are in constant mesh.

Figure 2:
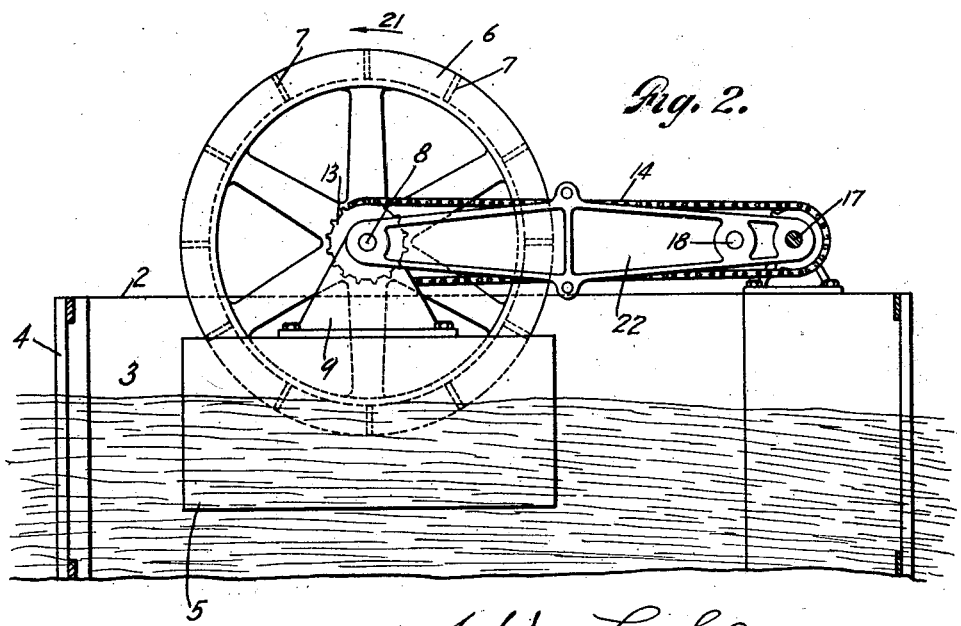
Fig. 2 is a section on the line 2—2 of Fig. 1.

It will be assumed that the tide is going out or moving toward the right in Figs. 1 and 2. This naturally causes the elevation of the float 5 and at the same time the rotation of the water wheel 6 in the direction of the arrow 21 in Fig. 2. The ratchet wheel 10 being in engagement with its pawl 11, the sprocket wheel 13 will be turned so as to transfer power by the mechanism 10 before described, to the shaft 17 to rotate it. When the tide turns, the water wheel 6 will be turned in the direction opposite the arrow 21 so as to effect the rotation of the ratchet wheel 10′ on the opposite or upper side in Fig. 1 and this sprocket wheel will act against the co-operating pawl 12 to rotate the sprocket wheel 13′ and thus through the sprocket mechanism, the shaft 18 the motion of which is transferred through the meshing gears 20 and 19 to rotate the shaft 17 but in the same direction that it was turned before.

It will be clear that the invention involves certain rather broad relations. I have shown a float for sustaining the water wheel. The float for this purpose may be entirely different from that shown. In like manner the mechanism for transferring alternately the power of the water wheel to the primary or main shaft 17 by way of the water wheel initially, need not be pawl and ratchet mechanism. The power can be taken off the shaft 17 for instance and may be transferred to any suitable device such as a generator and for the short time the shaft 17 or its equivalent is at rest at the turning of the tide, the power may be transferred by batteries. For additional security the ends of the shaft 8 may be supported in bearings at the free ends of the rockers or levers 22 supported for oscillation by the main or primary shaft 17.

What I claim is:

1. In an apparatus of the character described, the combination of a float, a water wheel supported by the float and to be rotated oppositely by the tides, a main shaft, a second shaft operatively connected with the main shaft, and means for transferring the effect of the water wheel to said main shaft when the water wheel is turned in one direction and for transferring such power to the second shaft when the water wheel is turned in the opposite direction.

2. In an apparatus of the character described, the combination of a float, a water wheel supported by the float and to be rotated oppositely by the tides, a main shaft, a second shaft operatively connected with the main shaft, and means involving pawl and ratchet mechanism for transferring the effect of the water wheel to said main shaft when the water wheel is turned in one direction and for transferring such power to the second shaft when the water wheel is turned in the opposite direction.

3. In an apparatus of the character described, the combination of a float, a water wheel supported by the float and to be rotated oppositely by the tides, pawl and ratchet mechanism, the ratchets of which face oppositely and one part of each mechanism being connected with the water wheel for rotation therewith, a driver operatively connected with each of the other members of the pawl and ratchet mechanisms, driven members operatively connected with the driving members, and shafts operatively connected with each other and to which said driven members are fastened.

In testimony whereof I affix my signature.

WILBUR L. SHEPARD.

Witnesses:
HEATH SUTHERLAND,
ELIZABETH A. BANNING.